United States Patent Office 3,464,312
Patented Sept. 2, 1969

3,464,312
GEAR CUTTING MACHINE FOR GENERATING HYPOID GEARS
Ryosetsu Takahashi, Yokohama, and Toru Hanzawa, Urawa, Japan, assignors to Yutaka Seimitsu Kogyo, Ltd., Yono, Japan
Filed May 2, 1967, Ser. No. 635,543
Claims priority, application Japan, Aug. 5, 1966, 41/51,019
Int. Cl. B23f 9/10
U.S. Cl. 90—5         2 Claims

ABSTRACT OF THE DISCLOSURE

This invention relates to a gear cutting machine for generating hypoid gears having clutches for indexing a gear blank and a reversibly varying speed motor for rotating a cradle in a reciprocative manner, the backward strokes of which in conjunction with the rotation of the blank serve to widen the spaces between gear teeth which have been cut in the forward strokes of the cradle and at the same time to cut the surfaces of gear teeth having a different spiral angle from those which have been cut in the forward strokes.

---

This invention relates to a gear cutting machine for generating hypoid gears of the type which has a circular face mill type cutter supported in a reversible rotating cradle.

In gear cutting machines for generating hypoid gears using circular face mill type cutters, there have widely been known two types of machines, in one of which a cradle is continuously rotated in one direction and in the other a cradle is reversibly rotated. The former type machine has not been developed owing to a technical disadvantage that a cradle having large mass must abruptly be accelerated and decelerated in order to shorten the time in which a cutter is not in cutting operation. As an alternative, the latter type machine has widely been employed. However, the machines hitherto used of this type are very complicated owing to the use of cylindrical cams and Geneva mechanisms for reversible rotation and indexing or a combined internal and external gear in mesh with a pinion for reversible rotation.

The object of the invention is to provide an improved gear cutting machine for generating hypoid gears of the latter type which is very simplified by the use of a reversible variable speed motor for the reversible rotation of a cradle and a single-tooth clutch the engagement and disengagement of which serve to index a gear blank and in which spaces between gear teeth which have been cut in the forward strokes of the cradle can be widened in the backward strokes and surfaces of gear teeth differing in spiral angle from those which have been cut in the forward strokes can be cut in the same backward strokes.

To the accomplishment of the foregoing object, the gear cutting machine according to the invention comprising a gear box supporting a cradle for rotation therein, a gear train driven by a reversible variable speed motor for reversibly variably rotating said cradle, a cutter-carrying spindle in said cradle, a gear train driven by another motor for driving said spindle, a gear blank holding work spindle supported in another gear box, a gear train adapted to be connected to the cradle-rotating gear train for driving the work spindle including generating change gears, a single-tooth clutch with two pieces for indexing, and indexing change gears, means for engaging said clutch for connecting in time the generating change gears to the indexing change gears and for disconnecting in time the generating change gears from the indexing change gears for stopping the work spindle and indexing when said clutch is being disengaged, means for reversing and changing the speed of the cradle-driving motor in time and means for moving in time the cutter carrying spindle toward and away from the work spindle.

The gear cutting machine according to the invention further comprises a differential gear, one of the sun gears of which is driven with a constant rotating ratio to said cradle, a disc cam secured to said cradle, and a roller supporting rod arranged at right angles to the axis of said disc cam and adapted to be reciprocated by a hydraulic mechanism actuated by the rotation of said cradle. In this manner the roller supporting rod is engaged with and driven by the disc cam and disengaged from the same. The linear movement of said rod is translated to a rotating movement which is in turn transmitted to the other of the sun gears of the differential gear through a reversible transmission unit and change gears and the rotation of the central shaft of the differential gear is transmitted to the gear blank mounting shaft through the generating change gears, the clutches and the indexing change gears. The roller supporting rod is adapted to be released from the disc cam during the forward rotations of the cradle and brought into engagement with the disc cam during the backward rotations of the cradle, thereby cutting surfaces of gear teeth having different spiral angles in the gear blank by the circular face mill type cutter in the forward and backward rotations of the cradle, respectively, and thereby cutting in the backward rotations to widen the spaces between gear teeth which have been cut in the forward rotations.

For a better understanding of the invention, reference is taken to the accompanying drawings in which.

Figure 1:
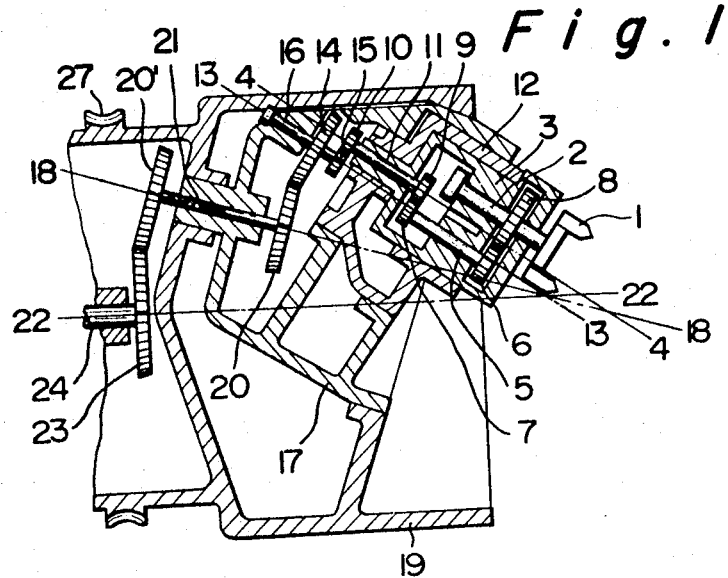
FIG. 1 is a sectional view of a cradle of a gear cutting machine according to the invention.

Referring to the drawings, a shaft 2 of a circular face mill type cutter 1 is rotatably supported in an eccentric cylinder 3 and eccentric to the central axis 4—4 of the cylinder 3. A gear shaft 5 is also rotatably supported in the eccentric cylinder 3 and is provided at its ends with gears 6 and 7, of which gear 6 is in mesh with a gear 8 on the shaft 2 of the cutter 1. A gear shaft 11 is also rotatably supported in the eccentric cylinder 3 and is provided at its ends with gears 9 and 10, of which gear 9 is in mesh with the gear 7. The eccentric cylinder 3 is supported by a swivel 12 in a rotatable manner on its axis 4—4 and is adapted to be fixed to the swivel 12 in any angular position. A gear shaft 16 provided with a bevel gear 14 and a gear 15 is rotatably supported by a swash frame 17 on the central axis 13—13 of the swivel 12. The swivel 12 is rotatably supported on its axis 13—13 by the swash frame 17 and adapted to be clamped in any angular position to the swash frame 17. The swash frame 17 is rotatably supported on its central axis 18—18 by a cradle 19 and adapted to be fixed in any angular position to the cradle 19. A gear shaft 21 provided at its ends with bevel gears 20 and 20' is rotatably supported on its central axis 18—18 by the swash frame 17. The gears 10, 15; 14, 20 are in mesh with each other, respectively. A gear shaft 24 provided at its end with a bevel gear 23 in mesh with the gear 20' is rotatably supported on the central axis 22—22 of the cradle 19. The cradle 19 is rotatably supported on a bearing 26 fixed to a bed 25. A worm wheel 27 formed on the cradle 19 is driven by a worm 28 rotatably supported by a gear box 29. The gear shaft 24 is rotatively driven through pairs of gears 31 and 32 by an electric motor 30 normally rotating in one selected direction. The cutter 1 is thus rotated continuously in one direction by the rotation of the motor 30. As can be seen from the above arrangement, the shaft 2 of the cutter 1 can be eccentric and tilted to the central axis 22—22 of the cradle 19.

A shaft 33 of the worm 28 is driven through pairs of gears 35, 36 and 37 by a reversible variable speed motor 34. To one end of the cradle 19 is fixed a sprocket wheel 38, which drives a control drum 41 with a rotating ratio 1:1 through a chain 39 and a sprocket wheel 40.

The rotating speed of the motor 34 can be changed and the rotating direction of the motor can also be reversed at will by the adjustment of the positions of cams 77 and 78 on the control drum 41, as described in detail hereinafter. Thus by the rotation of the motor 34 the cradle 19 is reversibly rotated to rock the cutter 1 eccentrically mounted to the central axis of the cradle 19.

The rotation of the shaft 33 is transmitted to a work spindle 58 and a gear blank 59 through clutch 42 or 43, transmission gears 44, 45; 49, 50; 52; 54, 56, 57, generating change gears 46, single-tooth clutch 47 or 48, telescopic shaft couplings 51, 53, and indexing change gears 55. The clutches 42 and 43, transmission gears 44, 45; 49, 50, generating change gears 46, single tooth clutch 47, 48 are housed in the gear box 29, gears 52 are housed in the column 60 and gears 54, 55, 56, 57 are housed in the gear box 61. The gear box 61 carries the work spindle 58 on one end of which is attached the gear blank 59. The gear box 61 is vertically slidable relative to the column 60, which is slidable along a T-slot 63 relative to a swivel base 62, which can be swiveled on a table 64 about a central shaft 65 along a circular T-slot 66 in the table 64, the gear box 61, the column 60 and the swivel base 62 being clamped in any position, respectively. The table 64 slides on the bed 25 along guide ways 68 by means of hydraulic means 67.

The transmission from the generating change gears 46 to the gear 49 can be achieved in a manner as described hereinafter.

A clutch 47 is splined on a final gear shaft 69 of the generating change gears 46 so that the clutch 47 is movable along the axis of the shaft 69. A clutch 48 mating with the clutch 47 is fixed in position on the end of the shaft 70 of the gears 49. The clutches 47 and 48 are adapted to be engaged and disengaged with each other. Each of the clutches is provided with only one tooth so that once the clutches are disengaged, they do not engage with each other until one full rotation relative to each other has been effected, and is provided on the clutch surface with an inclined portion such that the clutch 47 can move somewhat in an axial direction during the contact surfaces sliding across each other before the engagement of the clutches.

Figure 2:
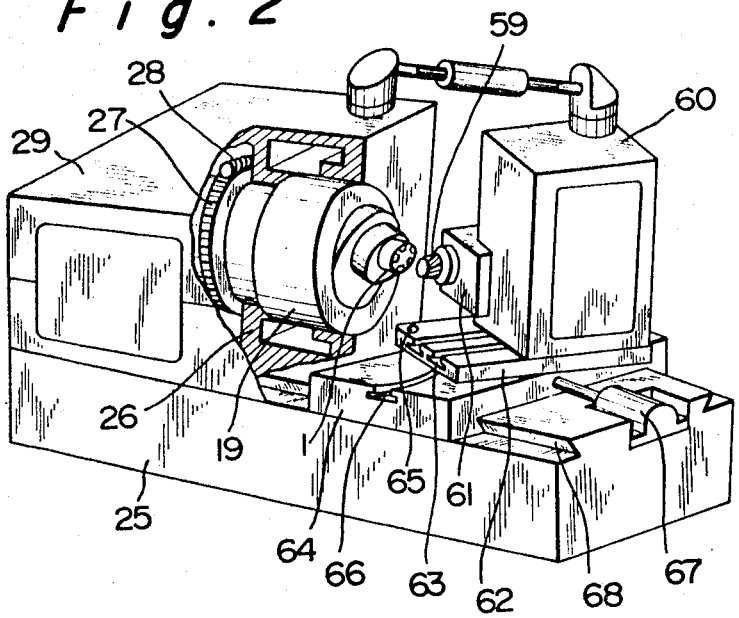
FIG. 2 is an explanative perspective view of the machine according to the invention.

The clutch 47 is moved to engage with or disengage from the clutch 48 by a shifter 71 which is provided at one end with a roller 72 and at the other end with a cam 73, and of which shifter fork 74 normally serves to urge the clutches 47, 48 against each other by a spring 75. The cam 73 acts upon a limit switch 73' as the shifter 71 is moved. The roller 72 is normally urged against an outer periphery of the control drum 41 by means of the spring 75. As the control drum 41 is rotated, by the actuation of a unidirectional cam 76 the roller 72 and hence the shifter 71 are moved to the right as viewed in FIG. 3 so that the clutch 47 is disengaged from the clutch 48. By the further rotation of the control drum 41 the roller 72 is moved away from the cam 76 so that the shifter 71 is moved to the left by the force of the spring 75 to urge the clutch 47 against the clutch 48. The limit switch 73' and the cam 73 are so adjusted that just before the complete engagement of the clutch 47 with the clutch 48, the cam 73 engages with the limit switch 73' of which signal causes the motor 34 to rotate at an intermediate speed between low and high speeds. The control drum 41 is provided on its cylindrical surface with cams 77 and 78 such that the rotation of the control drum 41 permits the cams to engage with and disengage from limit switches 77' and 78'. The engagement of the cam 77 with the limit switch 77' causes hydraulic means 67 to come into operation to move the table 64 to the right as viewed in FIG. 2 so that the gear blank 59 moves away from the cutter and at the same time the engagement causes the rotating speed of the motor 34 to change from the low speed to the high speed in the reverse direction. The engagement of the cam 78 with the limit switch 78' causes the rotating speed of the motor 34 to change from the intermediate speed in the normal direction to the low speed in the normal direction and causes the hydraulic means to come into operation so that the table 64 and hence gear blank 59 are moved toward the cutter 1.

A disc cam 101 having in part protruding cam surface is secured to the cradle 19. A cylinder 102 is arranged in forwardly and backwardly movable manner on an axis at right angles to the axis of the cam 101. A piston rod 104 integral with a piston 103 slidably extends through one cover of the cylinder 102 and is fixed with its end to a stationary wall 105. The end of the piston rod 104 is formed with screw threads extending through the wall 105 and is tightened by nuts 106 on either side of the wall so that the position of the fixed piston rod 104 can be adjusted. To the other end of the cylinder 102 is secured a roller supporting rod 107 provided at its end with a roller in opposition to the cam surface of the cam 101.

Figure 3:
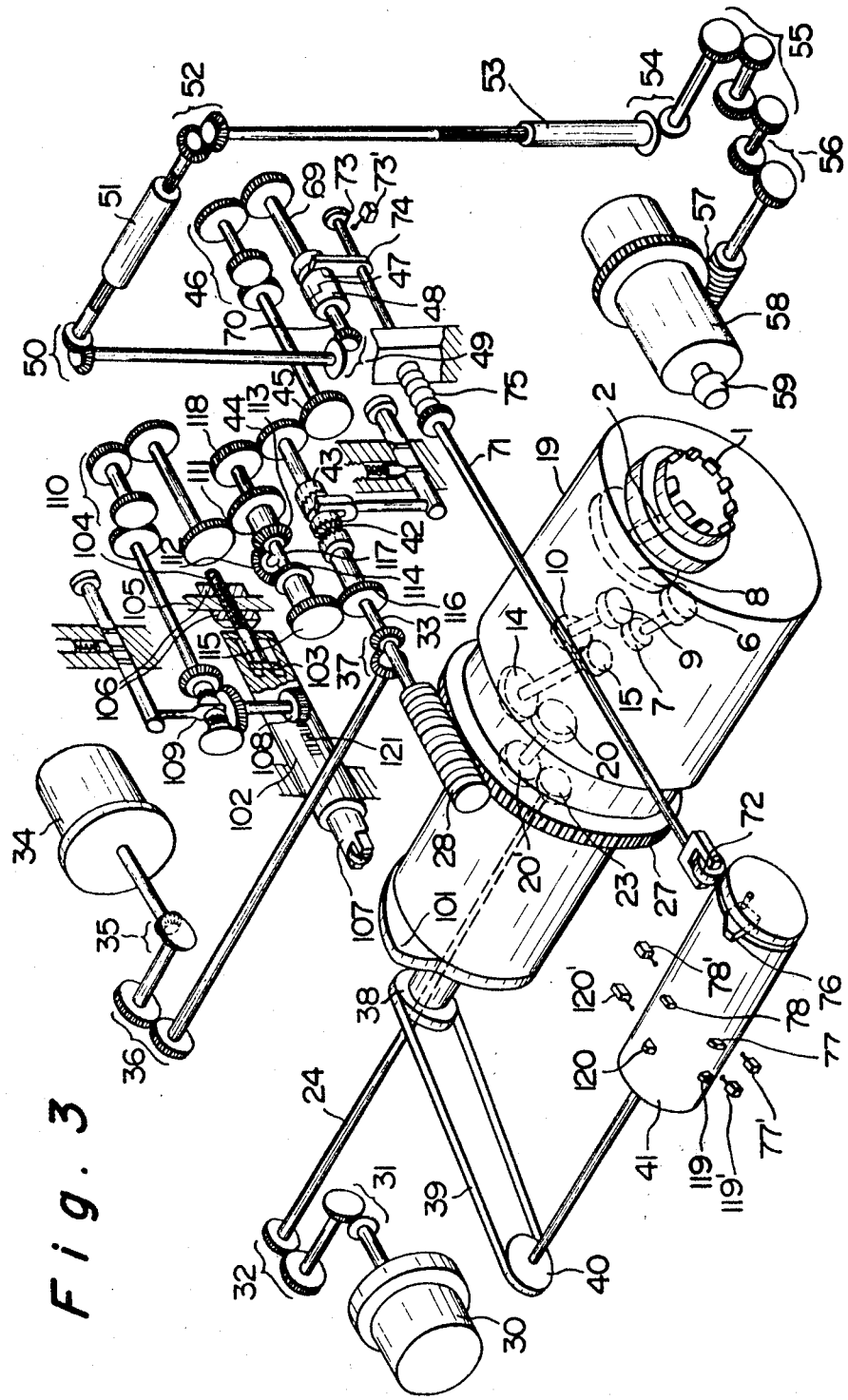
FIG. 3 is an explanative perspective view of the transmission mechanism of the machine in FIG. 2.

When hydraulic oil is fed into the left chamber of two chambers bounded by the piston 103 in the cylinder 102, the cylinder 102 is moved to the left as viewed in FIG. 3 to bring the roller at the end of the roller supporting rod 107 into contact with the cam surface so that the cylinder 102 is moved forwardly and backwardly as the disc cam 101 is rotated. When fluid is fed into the right chamber, the cylinder 102 is moved to the right so that the cover of the cylinder 102 abuts against the left end of the piston 103 with resulting stop of the cylinder 102. At the extreme abutting position of the cylinder 102 the roller at the end of the roller supporting rod 107 comes out of contact with the disc cam 101. The relative position of the cylinder 102 to the disc cam 101 is so adjusted as to satisfy the above mentioned relationship. The cylinder 102 is formed on its outer surface with a rack 121 in mesh with a gear 108 adapted to drive one of sun gears 113 of differential gear 112 through a reversible transmission unit 109, change gears 110, and a pair of gears 111. The other of sun gears 114 of the differential gear 112 is made integral with a gear 115 and in mesh with a gear 116 rotatably mounted on the worm shaft 33. When the clutch provided on one side of the gear 116 is engaged with a clutch 42, the rotation of the worm shaft 33 is transmitted to the sun gear 114 through the gears 116, 115, thereby rotation of the central shaft 117 of the differential gear 112 results in a resultant rotation from the sun gears 113 and 114, which is transmitted to the work spindle 58 and the gear blank 59 through the gears 118, 44 and 45, the generating change gears 46, the pairs of gears 49, 50, 52 and 54, the indexing change gears 55 and the pairs of gears 56 and 57.

The control drum 41 is further provided on its cylindrical surface with cams 119 and 120 other than the cams 77 and 78, which are adapted to engage with and disengage from limit switches 119' and 120', respectively. The limit switches 119' and 120' are so adjusted as not to come into operation when the reversible transmission gear 109 is in neutral position and the clutch 42 is engaged with the clutch 43 as shown in FIG. 3.

The gear cutting machine for generating hypoid gears according to the invention is constituted as above described.

When the clutch 47 is engaged with the clutch 48, the rotation of the motor 34 is transmitted on the one hand to the cradle 19 to revolve the cutter 1 rotating about its own axis and on the other hand to the change gears 46, 55 etc. to rotate the gear blank 59. In this manner when the gear blank 59 arrives at the cutting position gear profiles are cut in the gear blank, which are in mesh with the imaginary gear profiles described by the cutter 1 revolving and rotating about its own axis.

An operation for passing from one space, which has been cut in the above manner, to the next space to be cut will be described hereinafter.

When the cutter comes at the final position of one space, the cam 77 is engaged with the limit switch 77' which causes hydraulic means 67 to be brought into operation to move the gear blank 59 out of contact with the cutter 1 and at the same time the motor 34 changes its rotating speed from the low speed for cutting operation to the reverse high speed. The cam 76 is then engaged with the roller 72 to move the shifter 71 toward the right so that the clutch 47 is disengaged from the clutch 48. Thereafter the cam 76 comes out or contact with the roller 72 in sequence with the continuous rotation of the control drum 41 to move the shifter toward the left so that the clutch 47 is urged against the clutch 48. In this condition of the clutch 47 and 48 the clutch 48 stops or still rotates at a very low speed due to its inertia while the clutch 47 rotates so that they do not at once engage with each other. After the clutch 47 has slid on the clutch 48 and effected one full rotation relative to the clutch 48, they engage with each other. Since the cam 73 is engaged with the limit switch 73' to change the rotation of the motor 34 to the intermediate speed just before the engagement of the clutches 47 and 48, the engagement can be effected without any shock of connection. During these operations the gear blank 59 is indexed corresponding to one gear tooth. After the indexing has been completed, the cam 78 comes into contact with the limit switch 78' to change the speed of the motor to the normal low speed as above described so that the gear blank 59 approaches to the cutter 1 with the aid of hydraulic means 67, thus beginning the next gear cutting operation. Then the cam 76 is brought into contact with the roller 72. Since however the cam 76 is unidirectional, the cam 76 does not act on the roller 72 so that the gear cutting operation is continued until the cam 77 comes into contact with the limit switch 77' and the cutting operation ends off. After the desired numbers of teeth have been cut, the motors 30 and 34 are stopped by means of further provided instruction means.

As can be seen from the above described, the gear cutting machine in accordance with the invention is simplified in construction, in contradistinction to the known gear cutting machines using circular face mill type cutters. These known machines are complicated owing to the use of cylindrical cams and Geneva mechanism for reversible rotation and indexing or a combined internal and external gear in mesh with a pinion for reversible rotation. The gear cutting machine according to the invention employs a reversible variable speed motor for the reversible rotation of the cradle and the single-tooth clutch for indexing a gear blank, without using any complicated mechanism as used in the machine hitherto used.

The one way cutting by means of the clutch 42 engaged with the clutch 43 has been described hereinbefore. A cutting by means of the clutch 42 engaged with the clutch of the gear 116 after the clutch 42 has been disengaged from the clutch 43 will be explained hereinafter.

After the limit switches 119' and 120' have been brought into operative conditions by means of further provided control means, when the limit switch 77' is operated, hydraulic means 67 is brought into operation such that the gear blank 59 is caused to approach toward the cutter 1 instead of moving away therefrom, and when the limit switch 78' is operated, hydraulic means 67 is so actuated that the gear blank 59 is moved away from the cutter 1 without changing the rotational speed and direction of the motor 34.

The arrangement is so adjusted that when the cam 120 comes into contact with the limit switch 120', the rotation of the motor 34 is changed to the normal low speed and hydraulic oil is fed into the chamber on right-hand side of the piston 103 within the cylinder 102, after which hydraulic means 67 is operated so that the gear blank 59 is moved toward the cutter 1, and when the cam 119 comes into contact with the limit switch 119', hydraulic means 67 is operated so that the gear blank 59 is moved away from the cutter 1, after which hydraulic oil is fed into the left-hand chamber within the cylinder 102. The reversible transmission unit 109 is so adjusted that the gear on left side constituting the unit is driven from its neutral position.

Figure 4:
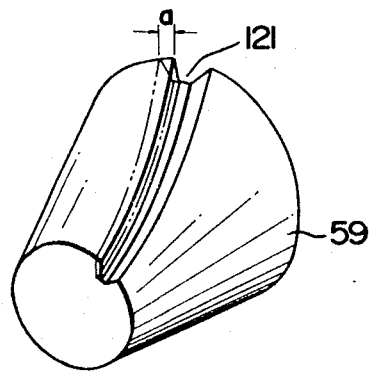
FIG. 4 is an explanative perspective view of a gear blank being cut a space therein.
Figure 5:
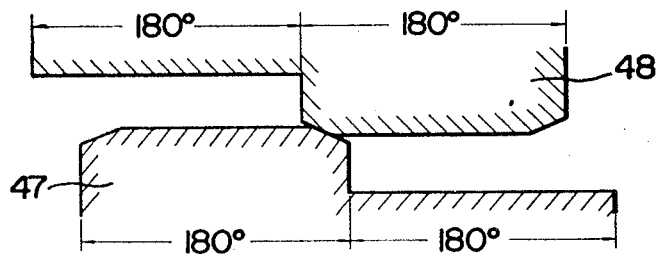
FIG. 5 is a developed diagram of indexing clutches indicating the profiles of clutch teeth.

It is assumed that the cam 120 has been in contact with the limit switch 120' so that oil under pressure has been fed in the right chamber of the cylinder 102, thereby the cylinder being held in the extreme right hand position, before the cam 78 is in contact with the limit switch 78'. Since the disc cam 101 is out of contact with the roller on the roller supporting rod 107, the cylinder 102 is not moved even though the cradle 19 is rotated so that the reversible transmission unit 109, the change gears 110, the pair of gears 111 and the sun gear 113 are not moved and the rotation of the worm shaft 33 is transmitted to the gear 44 through the clutch 42, the gears 116 and 115, sun gear 114, the central shaft 117 of the differential gear 112 and the gear 118. As a result of which in the same manner as above described the cradle 19 and the gear blank 59 are rotated with the total rotating ratio of all of the gears therebetween so that a space 121 between gear teeth having a determined spiral angle is cut in the gear blank 59 by the cutter 1 as shown in FIG. 4.

After the space 121 has been cut from the smaller end to the larger end of the gear blank by the forward rotational movement of the cradle 19, even if the cradle 19 is reversely rotated the cutter 1 will only be returned from the larger end to the smaller end along the same space without cutting. In fact, however, when the cam 119 has been in contact with the limit switch 119' after cutting completely the larger end, the gear blank 59 is moved away from the cutter 1 by the operation of hydraulic means 67 and then oil under pressure is supplied to the left hand chamber in the cylinder 102 to move the cylinder 102 to the left so that the roller on the roller supporting rod 107 is engaged with the disc cam 101. The forward movement of the cylinder 102 toward the disc cam 101 causes the gear 108 to rotate, with the result that the central shaft 117 rotated by the sun gear 114 is further additionally rotated by the rotation of the gear 108 through the reversible transmission unit 109, the change gears 110, the pair of gears 111, so that the rotation of the gear blank 59 driven by the series of the above gears is added with a certain rotation.

When the cam 77 is then brought into contact with the limit switch 77', the rotation of the motor 34 is changed to the reverse high speed and at the same time the gear blank 59 approaches to the cutter 1 by the operation of hydraulic means 67, thereby starting the cutting in the backward movement. In this cutting, the cutting position of the cutter 1 deviates from the original space edge by $a$ as shown in FIG. 4, thereby widening the space between gear teeth.

The profile of the disc cam 101 is so designated that the lift of the cam is increased in proportion to the rotating angles of the cam, so that the rotations of the cradle 19 and the disc cam 101 cause the cylinder 102 to move to the right to rotate the gear 108.

Since the rotation of the central shaft 117 of the differential gear 112 is affected by the resultant of the rotations of the sun gears 113 and 114, the profile of the disc cam 101 and the gear ratios of the change gears 110 are so selected that gear tooth surfaces having larger spiral angles than those cut in forward movements can be cut in backward movements.

The widened amount of the spaces can be adjusted by adjusting the two nuts 106 to vary the position of the piston rod 104 relative to the stationary wall 105.

When the cam 78 is brought into contact with the limit switch 78' after finishing the cutting in the backward stroke, the gear blank 59 comes out of contact with the cutter 1 by the operation of hydraulic means 67, and then the cam 76 is brought into contact with the roller 72, thus indexing the gear blank 59. After that the cam 120 is brought into contact with the limit switch 120' so that the rotation of the motor 34 changes to the low speed in reverse or the speed in normal cutting from the smaller end to the larger end of the gear blank and at the same time the gear blank 59 approaches to the cutter 1, thus cutting the next space between teeth. After the desired numbers of gear teeth have been cut, the motors 30 and 34 are stopped by means of further provided instructing means in the same manner as in the one way cutting aforementioned.

To reverse the spiral direction of the spaces all that is required to the operator are to reverse the direction of the rotation of the motor 34, to reverse the disc cam 101 end-for-end, to change over the reversible transmission unit 109 to reverse the rotational direction of its output shaft, to reverse the cam 76 end-to-end so as to change its operating direction and to adjust the positions of the cams 76, 77, 78, 119 and 120 secured to the control drum 41.

In the latter embodiment of the invention, by the use of a simple arrangement in which the disc cam secured to the cradle is adapted to engage with the hydraulic cylinder, the spaces which have been cut in the forward strokes of the cradle are widened in the backward strokes of the cradle and the surfaces of the gear teeth differing in spiral angle from those which have been cut in the forward strokes can be cut in the same backward strokes.

What we claim is:

1. A gear cutting machine with a circular face mill type cutter for generating hypoid gears comprising a gear box supporting a cradle for rotation therein, a gear train driven by a reversible variable speed motor for reversibly variably rotating said cradle, a cutter-carrying spindle in said cradle, a gear train driven by another motor for driving said spindle, a gear blank-holding work spindle supported in another gear box, a gear train adapted to be connected to the cradle-rotating gear train for driving the work spindle including generating change gears, a single-tooth clutch with two pieces for indexing, indexing change gears, means for engaging said clutch for connecting in time the generating change gears to the indexing change gears and for disconnecting in time the generating change gears from the indexing change gears for stopping the work spindle and indexing when said clutch is being disengaged, and means for reversing and changing the speed of the cradle-driving motor in time and means for moving in time the cutter carrying spindle toward and away from the work spindle.

2. A gear cutting machine for generating hypoid gears as claimed in claim 1 further comprising differential gears one of the sun gears of which is driven with a constant rotating ratio to said cradle, a disc cam secured to said cradle, and a roller supporting rod arranged at right angles to the axis of said disc cam and adapted to be reciprocated by a hydraulic mechanism actuated by the rotation of said cradle such that said roller supporting rod is engaged with and driven by said disc cam and disengaged from the same, the linear movement of said rod being translated to a rotating movement which is in turn transmitted to the other of said sun gears of said differential gear through a reversible transmission unit and change gears and the rotation of the central shaft of said differential gear being transmitted to the work spindle through said generating change gears, said clutches and said indexing change gears, said roller supporting rod being adapted to be released form said disc cam during the forward rotations of said cradle and brought into engagement with said disc cam during the backward rotations of said cradle, thereby cutting surfaces of gear teeth having different spiral angles in said gear blank cut by said circular face mill type cutter in the forward and backward rotations of said cradle, respectively, and thereby cutting in the backward rotations to widen the spaces between gear teeth which have been cut in the forward rotations.

References Cited

UNITED STATES PATENTS

| 2,284,636 | 6/1942 | Carlsen | 90—5 |
| 3,213,756 | 10/1965 | Ash | 90—5 |
| 3,288,031 | 11/1966 | Krastel et al. | 90—5 |

ANDREW R. JUHASZ, Primary Examiner

GIL WEIDENFELD, Assistant Examiner